H. T. ALLEN.
HAY HARVESTER.
APPLICATION FILED JULY 21, 1914.

1,127,152.

Patented Feb. 2, 1915.
2 SHEETS—SHEET 1.

WITNESSES
L. H. Schmidt
Alan F. Garner

INVENTOR
Houston T. Allen,
BY Munn & Co
ATTORNEYS

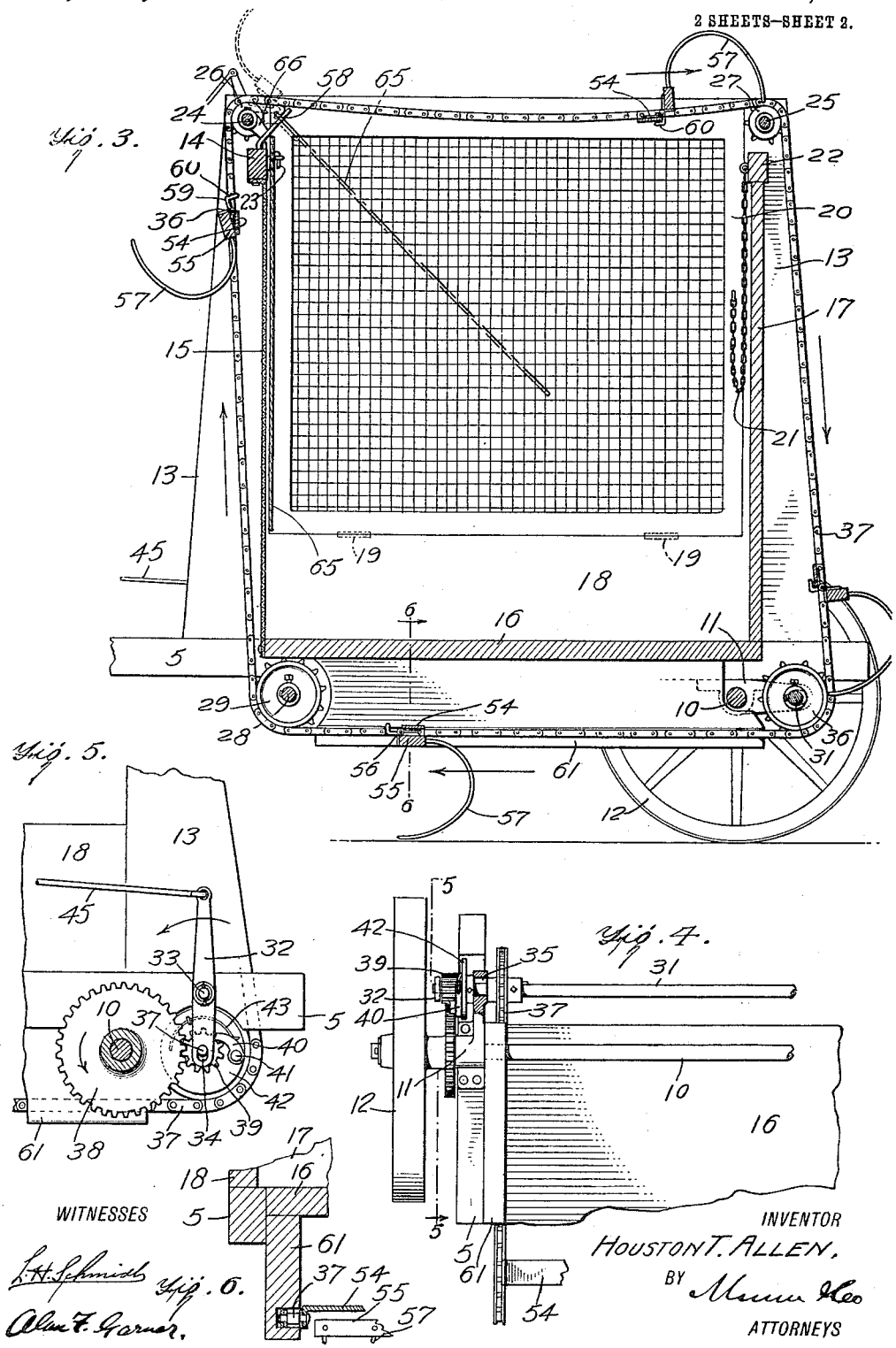

UNITED STATES PATENT OFFICE.

HOUSTON T. ALLEN, OF NASHVILLE, TENNESSEE.

HAY-HARVESTER.

1,127,152. Specification of Letters Patent. Patented Feb. 2, 1915.

Application filed July 21, 1914. Serial No. 852,262.

*To all whom it may concern:*

Be it known that I, HOUSTON T. ALLEN, a citizen of the United States, residing at Nashville, in the county of Davidson and State of Tennessee, have invented a new and useful Improvement in Hay-Harvesters, of which the following is a specification.

This invention relates to harvesters, and more particularly to an improvement in hay harvesters.

One of the principal objects of the invention is to provide a harvester including a rake, a loader, and a hay wagon, assembled in a single machine, the rake and loader adapted to automatically gather and load the hay into the wagon, as the latter moves along.

Another object of the invention is to provide a harvester having a wheel supported hay bed or frame, and having a loader including sprocket chains encircling and adapted to travel around the hay frame, the rakes being swung at intervals from the chains and adapted to be carried along the ground in the same direction as the direction of the travel of the frame for gathering the hay, means being provided for the driving of the chains from the ground wheels, and for the tripping of the rakes whereby to empty the latter into the frame.

A further object of the invention is to provide a harvester of the class described with a rotary carriage and with means for throwing the carriage into or out of gear with the drive wheels at will.

Still another object of the invention is to provide a harvester of the type set forth which will be simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1:
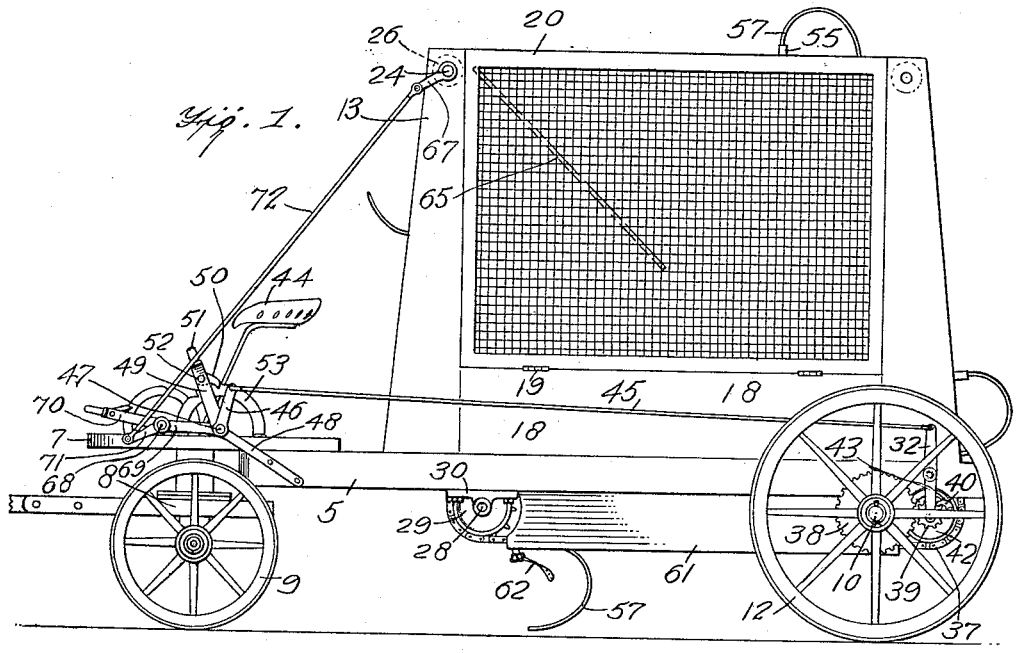
Figure 2:
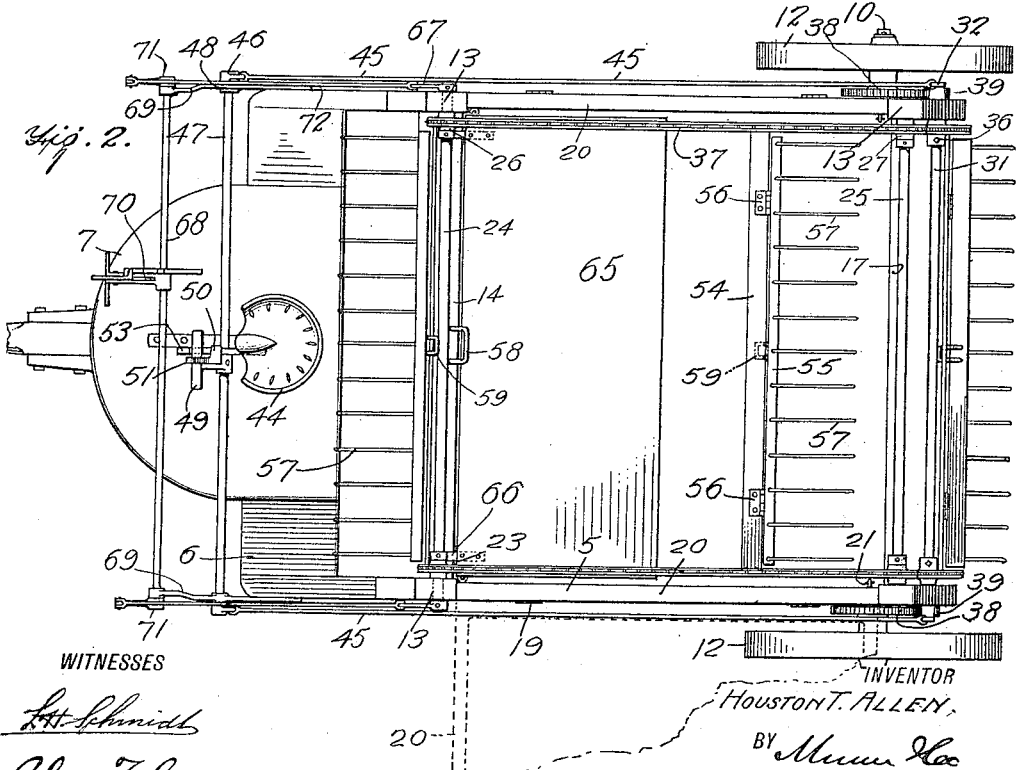

Figure 1 represents a side elevational view of a harvester constructed according to my invention. Fig. 2 represents a top plan view thereof. Fig. 3 represents a vertical longitudinal sectional view taken centrally therethrough. Fig. 4 represents a fragmentary bottom plan view showing details of the driving mechanism. Fig. 5 represents a fragmentary side elevational view of a portion of the driving mechanism, the ground wheel adjacent said mechanism being removed. Fig. 6 represents a detail sectional view taken transversely on the plane indicated by the line 6—6 of Fig. 3.

The running gear of the harvester comprises side bars 5 connected by a front cross bar 6 on which a platform 7 is disposed, to which platform is connected a front truck 8, which is swiveled to turn relatively to the harvester body, and whose wheels 9 are disposed in relatively close relation to each other. A rear axle 10 is supported adjacent its ends in bearings 11 secured to the under edges of side bars 5 near the rear ends thereof, and on said axle 10 outside of bars 5 are journaled the ground wheels 12. The hay bed or frame is carried by the side bars 5, and comprises corner uprights 13 secured to and supported by the side bars, the uprights nearest the front truck supporting a cross piece 14 to which is secured the upper edge of a suitable wire screening 15, which screening forms the front wall of the hay frame, the lower edge of which screening is secured to the front edge of the bottom 16, of the frame, which bottom is preferably solid and is supported by the side bars 5.

The rear walls 17 of the frame are supported between the two uprights 13 adjacent the rear end of the harvester, and both the front and the rear walls at their upper edges terminate somewhat below the upper ends of the standards 13. The side walls of the frame include panels 18 disposed on side bars 5 and connecting uprights 13, upon the upper edges of which panels are hinged as at 19 suitably screened frames 20, which may be swung outwardly on their hinges, which outward swinging movement is limited by the chains 21 connected to frames 20 and to cross piece 22 at the upper edge of rear wall 17, the frames being maintained normally in raised position by means of hook latches 23.

Disposed transversely of the frame substantially at the four corners thereof are shafts carrying sprocket wheels upon which the endless chain carrier operates, said carrier entirely encircling the hay frame and adapted to travel around the same as the vehicle moves over the field. Two of the shafts are disposed as at 24 and 25 between the uprights above the front and rear walls respectively of the frame, and on each of said shafts is journaled a pair of sprocket wheels 26 and 27, respectively, a third shaft 28 carrying a pair of sprocket wheels 29 is journaled at its ends in brackets 30 secured to and depending from the side bars 5 adjacent to and below the forward edge of bottom 16 of the frame. A fourth shaft 31 is disposed rearwardly of and in spaced relation to the rear axle 10, and is maintained in adjustable position relatively to said axle by means of a pair of levers 32 pivoted midway their length as at 33 to side bars 5 near the rear ends of the latter, in the lower ends of which levers shaft 31 is journaled, the ends of said shaft being borne in elongated slots 34 provided in the levers, said shaft also extending at points spaced inwardly from its ends, through elongated slots 35 provided in extensions of the axle bearings 11, said slots 35 adapted to guide shaft 31, in its movement toward and away from axle 10.

Sprocket wheels 36 are carried by shaft 31, and over the sprocket wheels carried by the various shafts the endless chains 37 run, said chains and necessarily said sprocket wheels being disposed adjacent to the opposite sides of the hay frame, as indicated clearly in Fig. 2, the chains being however, disposed in planes occurring on the inside rather than the outside of the lateral portions of the frame. The chains form a carrier for the rakes, and are adapted to be driven in such a direction that the lowermost flight of the carrier travels above the ground in a direction as indicated by the lowermost arrow in Fig. 3, coincident with the direction of travel of the vehicle, the mechanism by which the carrier is driven comprising a relatively large cog wheel 38 carried by each of the ground wheels between said wheels and the side bars 5, said cog wheels adapted to be engaged when the shaft 31 is shifted toward shaft 10, by the pinions 39 loosely mounted adjacent the opposite ends of shaft 31 inwardly of the lower ends of levers 32, said pinions 39 adapted to be locked relatively to shaft 31 when the ground wheels turn forwardly, by means of detents 40 pivoted at 41 to disks 42 fast on shaft 31 adjacent the pinions 39, said detents 40 being maintained in engagement with the teeth of pinions 39 by means of the springs 43 carried by disks 42, which detents 40 prevent rotary movement of pinions 39 relatively to shaft 31 when the ground wheels move forwardly carrying with them the cog wheels 38 as will be readily understood from Fig. 5, but allow rotary movement of pinions 39 relatively to the shaft 31 upon reverse rotation of the ground wheels. The sprocket wheels 36 are keyed to shaft 31 so that when said shaft is thrown into gear with the ground wheels the chain carrier is driven in its path around the hay frame.

A driver's seat 44 is mounted upon the platform 7, and from said seat the driver of the harvester may at will operate the levers 32 for throwing the carrier into or out of gear with the ground wheels, by means of the rods 45 positioned outside of the hay frame and connected at their rear ends one to each of the upper ends of levers 32, said rods 45 being connected at their forward ends to the arms 46 carried by a rock shaft 47 disposed transversely of platform 7 and journaled in brackets 48 carried by the side bars 5 near their forward ends, said rock shaft being provided with a foot actuatable lever 49 provided with a detent 50 carried by an arm 51 pivoted at 52 to the foot actuatable lever 49, said arm 51 being spring actuated and adapted to co-act with a toothed segment 53 to maintain the lever 49 and consequently the shaft 31 in adjusted position.

The rakes are disposed at suitable spaced intervals along the chain carrier, and comprise bars 54 disposed transversely of the hay frame, and connected at their ends to the links of chains 37, said bars 54 having rake bars 55 hinged thereto as at 56 on what will be their forward edges when they are beneath the hay frame in the position of the lowermost bar 54 in Fig. 3, said bars 55 carrying the curved rake teeth 57, so disposed as to move forwardly beneath the frame as the vehicle travels along thus gathering the hay, said rakes being carried upwardly by the chain carrier along the front wall 15 on the outside thereof, as indicated in Fig. 3, enough space being left between the front cross bar 6 of the running gear and the hay frame proper to allow for the passage of rakes between said bar and frame. The hay is supported upon the rakes and carried upwardly thereby until said rakes successively reach and pass over the top front shaft 24, at which point the rakes are tripped into the dotted line position shown in Fig. 3 in order to dump the hay within the frame, by means of a U-shaped catch 58 carried centrally of the front top cross piece 14, said catch adapted to co-act with the trip arms 59 carried by the bars 55 of the rakes, in swinging said bars upwardly on their hinges 56 relatively to bars 54 into the dotted line position shown.

Upon traveling across the hay frame and downwardly on the rear thereof, the rakes are in position when they reach the beginning of the horizontal movement to engage and gather the hay over which the vehicle is passing. The trip arms 59 are bent at their outer ends as at 60 to provide means whereby to engage the catch 58 as the rakes pass therethrough, the bent portion 60 also serving to engage as indicated in Fig. 3, the bars 54 to limit the swinging movement of the rakes relatively to said bars, whereby to maintain the said rakes in such position that when they approach the rear top shaft 25 the rake teeth 57 will be maintained in such position as to pass over said shaft without engaging the same. In order to guide the lower flight of the carrier in its passage beneath the frame, the chains are disposed to travel in grooves formed in the inner faces of guide plates 61 depending from floor 16 of the frame at the lateral edges thereof, as indicated in Fig. 6. Said guide plates prevent the tendency of the chain carriers to bulge or slack upwardly incident to the gathering of the hay upon the hay forks.

The tripping mechanism whereby the rakes are dumped, is situated at the front part of the frame, and hence the hay unless otherwise prevented, would fall into the front part of rather than the rear of the hay frame. In order that the rear portion of the frame as well as the front portion thereof may receive the hay, I have provided a swinging door or chute indicated at 65. The door is carried by arms 66 secured as indicated to shaft 24, said door depending within the hay frame near the front screen wall 15 thereof. The ends of shaft 24 are extended beyond the corner uprights 13, and are journaled in said uprights, and to the outer ends of said shaft, arms 67 are keyed.

In order that the door may be operated from the driver's seat, a second rock shaft 68 is provided, said rock shaft being journaled transversely of the platform 7, in extensions 69 of the brackets 48.

A segment and lever mechanism for operating shaft 68 and for maintaining it in adjusted position, is indicated at 70. The shaft 68 is arranged in advance of shaft 47, and at its ends carries crank arms 71. Links 72 connect the crank arms 71 with the arms 69, and it will be readily understood that by rocking shaft 68 the shaft 24 will be made to rock, and the door 65 raised or lowered as the case may be. When the loading process is begun, the door is swung rearwardly as indicated in dotted lines in Figs. 1 and 3. By thus inclining the door the hay when the rakes are tripped will drop upon the door and be projected into the rear part of the frame, and as this part is filled up the door may be dropped into the full line position shown in Fig. 3, so that the front portion of the frame may then be filled.

Some suitable means is provided for maintaining the lowermost rake teeth out of engagement with the ground after the shaft 31 has been thrown out of gear with the ground wheels, and preparatory to driving the harvester to the barn or hay rick, said means being shown as including a strap 62 connected to one of the guide plates 61 as indicated in Fig. 1, said strap adapted to be passed around one of the rake teeth 57 and then buckled or otherwise suitably fastened so as to maintain said rake out of engagement with the ground as the harvester goes along. The strap will of course be disengaged from the rake teeth preparatory to throwing the rake into operation It will be understood from the foregoing description that a machine constructed according to my invention will rake up and gather the hay as it passes thereover and will deposit the same automatically within the hay frame, and that the rakes may be so positioned as to consecutively engage the hay passed over by the vehicle so that none of it will be missed, and by reason of the structure set forth it is evident that a combined hay rake, loader and hay wagon is provided in a single machine, which machine is capable of operation in a very efficient manner, and at the same time is extremely simple, and capable of long service. The front truck wheels are comparatively close together, while the rear ground wheels are a distance apart substantially equal to and slightly greater than the width of the frame, and by this construction short turns may be accomplished at the end of rows or when circumstances so demand.

It is my intention to manufacture the harvesters so that they may be drawn by horses or other suitable draft animals, or by suitable motors, the method of propulsion being determined by the necessities of the case.

Although I have described the preferred embodiment of my invention, I may desire to make such changes in the construction, combination and arrangement of parts thereof as do not depart from the spirit of the invention and the scope of the appended claims.

I claim: —

1. A harvester comprising a running gear, a frame mounted thereon and having an open top, a plurality of shafts journaled each adjacent one corner of the frame, and transversely thereof, an endless traveler supported by the shafts and extending entirely around the frame, means for driving one of the shafts from the ground wheels of the running gear at will, means on the endless traveler for gathering and delivering hay to the frame through the open top thereof, and means mounted upon one of the shafts and adapted to receive the hay within the frame, for distributing the same therein.

2. A harvester of the class described comprising a running gear, including a front truck and rear ground wheels, a hay frame supported upon the running gear, said hay frame including corner standards, a solid bottom, a solid rear wall, a cross piece supported by a pair of the standards at the forward portion of the frame, a wire screening connected to said cross piece and to the bottom for forming the front wall of the frame, panels disposed between and connected to the uprights on the lateral sides of the frame, screened frames hinged to said panels and adapted to form side walls of the frame, means for normally maintaining said side walls in raised position, means adapted to limit the outward movement of said side walls, a rake and carrier adapted to deposit hay into said frame through the open top thereof, and means for driving said rake and carrier.

3. A harvester of the class described including a running gear, a hay frame mounted thereon, ground wheels carried by the running gear, a pair of shafts disposed transversely of said frame near the front and rear walls thereof at the top of the frame, a third shaft disposed transversely of the frame beneath the same and near the front wall thereof, a fourth shaft, pivoted links in which said fourth shaft is journaled, said links adapted to be pivoted for adjusting said fourth shaft relative to said ground wheels, means for operating said levers at will, sprocket wheels carried by all of said shafts, chains carried by said sprocket wheels and encircling said hay frame, transversely disposed bars connected to the chains, rakes swingingly suspended from said bars and coöperating means between the ground wheels and said fourth shaft whereby to drive the latter, said rakes adapted to be carried by said chains around beneath the frame in engagement with the ground and up and over said frame, and means for tripping said rakes whereby to deposit the hay carried by them into said frame.

4. A harvester of the class described comprising a hay frame, a flexible endless carrier supported in position to surround said frame, means for driving said carrier at will, rakes disposed at spaced intervals transversely of said carrier and frame and swingingly suspended from said carrier, said rakes adapted to consecutively engage the hay over which the frame passes, and means for tripping said rakes, said means comprising a catch supported by the frame, and a trip arm carried by each rake, said trip arm adapted to engage said catch whereby to tip each rake for depositing the hay into the frame as said rake passes thereover.

5. A harvester of the class described comprising a running gear, a hay frame mounted thereupon, an endless carrier surrounding said hay frame and adapted to be rotated around the same, rakes carried by said carrier, a shaft, pivoted levers in which said shaft is journaled, sprocket wheels carried by said shaft over which said carrier runs, ground wheels, cog wheels carried by said ground wheels, said shaft adapted to be shifted toward and away from said cog wheels, pinions loosely mounted upon said shaft, disks keyed to said shaft adjacent said pinions, a spring actuated detent carried by each of said disks in engagement with said pinions, said pinions adapted to engage said cog wheels when said shaft is shifted toward the same, said detents adapted to lock said pinions with said shaft upon forward movement of said ground wheels and adapted to allow movement of said pinions relative to said shaft upon reverse movement of said ground wheels, and means for guiding said shaft in its movement relatively to said cog wheels, said means comprising bearings having elongated slots therein through which said shaft extends, an axle on which said ground wheels are journaled, said axle extending through said bearings.

6. A harvester of the class described comprising a wheel supported hay frame, a flexible carrier extending around said hay frame, means for supporting said flexible carrier whereby the latter may be rotated around the frame, rakes supported by said carrier, means for driving said carrier at will, said carrier comprising chains, bearing plates depending from said frame, said plates provided on their inner faces with longitudinal grooves, said chains adapted to extend through said grooves, whereby to guide the lower flight of said chains.

7. A harvester of the class described including a hay frame, a carrier positioned so as to travel around the same, rakes carried by said carrier, means for driving said carrier at will, means whereby said carrier may be thrown into and out of gear with said driving means, last said means including a shaft, bearings provided with elongated slots through which said shaft extends, pivoted levers having elongated slots through which the ends of said shafts extend, a rock shaft, links connecting said rock shaft and said levers, and means for operating said rock shaft and for maintaining said rock shaft in adjusted position whereby to adjust the position of said shaft relatively to the driving means.

8. A harvester of the class described comprising a running gear, said running gear including a front cross bar, a platform mounted thereupon, a front truck journaled beneath and connected to said platform, a hay frame mounted upon said running gear, said hay frame being disposed in spaced relation to said cross bar, a flexible carrier extending around said frame, means for supporting said carrier whereby to allow rotation of the same relatively to the frame, rakes supported by the carrier, said carrier adapted to be actuated whereby to move said rakes consecutively along the ground in the same direction as the direction of travel of the harvester, whereby the rakes may engage the hay passed over by said harvester, means for driving said carrier and rakes, and means for consecutively tripping said rakes whereby to dump the contents of the same into said frame.

9. A harvester of the class described comprising a wheel supported hay frame, a carrier extending around said frame, means for supporting said carrier whereby the latter may travel around the frame, rakes supported by said carrier, means for driving said carrier in the direction of travel of the frame, means for tripping said rakes whereby to deposit the contents thereof into said frame, and means for throwing said carrier in and out of engagement with the driving means at will.

10. A harvester of the class described including a frame movable over the ground, a rotary traveler surrounding the frame, rakes carried by the traveler, means for driving the traveler at will in the direction of movement of the frame, and means for tripping the rakes whereby to deposit the contents thereof into the frame.

11. A harvester of the class described comprising a wheel supported hay frame, a carrier, means for supporting said carrier whereby the latter may travel around the frame, means carried by the carrier for gathering and depositing hay into the frame, and means for projecting the hay into the desired portion of the frame, said means including a shaft, a door disposed within the frame, arms keyed to the shaft and carrying the door, a rock shaft, means for operating the latter at will, and connecting means between said rock shaft and first said shaft.

12. A harvester of the class described including a frame movable over the ground, a rotary traveler surrounding the same, rakes carried by the traveler, means for tripping the rakes whereby to deposit the contents thereof into the frame, and means for projecting said contents into the desired portion of the frame.

13. A harvester including a hay frame, an endless traveler supported upon the frame and surrounding the same in a vertical plane, rakes carried by the traveler, tripping means for the rakes whereby to deliver the hay from the rakes to the frame, and means for driving the carrier.

14. A harvester including a hay frame, an endless carrier extending entirely around the frame in a vertical plane and supported thereupon and adapted to be driven relatively thereto, and means carried by the traveler for delivering hay to the frame.

15. A harvester including a hay receiving frame, an endless rake disposed in a vertical plane and surrounding the frame, and means for driving the lower run of the rake in the direction of travel of the frame for delivering hay thereto.

16. A harvester including a vehicle having a hay receiving receptacle, an endless carrier mounted upon the vehicle and extending entirely around the receptacle in a vertical plane, means for driving the carrier at will as the vehicle moves along, and means on the traveler for gathering and delivering hay to the receptacle.

17. A harvester comprising a frame movable over the ground, an endless traveler extending entirely around the frame, means for driving the traveler about the frame at will, means on the traveler for gathering and delivering hay to the frame and means for receiving hay from last said means for distributing the hay within the frame.

HOUSTON T. ALLEN.

Witnesses:
M. W. PINSON,
ROBT. B. ELIZER.

Copies of this patent may be obtained for five cents each, by addressing the "Commissioner of Patents, Washington, D. C."